US008674942B2

(12) United States Patent
Fujita et al.

(10) Patent No.: US 8,674,942 B2
(45) Date of Patent: Mar. 18, 2014

(54) MIXING CONSOLE WITH TOUCH PANELS FOR MANAGING USER-DEFINED KEYS

(75) Inventors: Hiroaki Fujita, Hamamatsu (JP); Kotaro Terada, Hamamatsu (JP)

(73) Assignee: Yamaha Corporation (JP)

( * ) Notice: Subject to any disclaimer, the term of this patent is extended or adjusted under 35 U.S.C. 154(b) by 520 days.

(21) Appl. No.: 12/883,625

(22) Filed: Sep. 16, 2010

(65) Prior Publication Data

US 2011/0069011 A1 Mar. 24, 2011

(30) Foreign Application Priority Data

Sep. 18, 2009 (JP) ................................ 2009-216864

(51) Int. Cl.

*G06F 3/02* (2006.01)
*G06F 3/041* (2006.01)
*G09G 5/00* (2006.01)
*H04B 1/00* (2006.01)

(52) U.S. Cl.

USPC ............................ 345/172; 345/173; 381/119

(58) Field of Classification Search

USPC .......... 345/156–184; 381/119, 306, 333, 388; 700/94

See application file for complete search history.

(56) References Cited

U.S. PATENT DOCUMENTS 4,903,565 A * 2/1990 Abe ................................ 84/611
RE39,059 E * 4/2006 Foster ........................... 715/744
8,073,159 B2 12/2011 Ando
8,103,964 B2 1/2012 Okabayashi
2006/0022956 A1 2/2006 Lengeling et al.
2006/0045292 A1 3/2006 Ando
2007/0209002 A1* 9/2007 Terada et al. ................. 715/705
2007/0229474 A1 10/2007 Okabayashi
2011/0069025 A1 3/2011 Fujita et al.

FOREIGN PATENT DOCUMENTS

JP 2007-267135 A 10/2007
JP 2008-252369 A 10/2008

OTHER PUBLICATIONS

Diablo screen shot, [url=http://www.imageslime.com/screenshot/Inventory-Diablo-3-651][img]http://www.imageslime.com/img/Inventory-Diablo-3-651.jpg[/img][/url].
Diablo screen shot 2, http://www.mobygames.com/images/shots/l/465137-diablo-macintosh-screenshot-inventory-holding-carryings.png.

* cited by examiner

*Primary Examiner* — Ariel Balaoing
*Assistant Examiner* — Larry Sternbane
(74) *Attorney, Agent, or Firm* — Rossi, Kimms & McDowell LLP

(57) ABSTRACT

On a sub-display 14*c*, a plurality of first user-defined keys 53, bank switch keys 51 and an edit key 52 which are software keys are displayed. Immediately below the sub-display 14*c*, second user-defined keys 50*a* to 50*d* which are hardware keys arranged as if the arrangement of the first user-defined keys 53 were extended are provided. The sub-display 14*c* also displays user-definition name areas 54 for displaying respective names of user-definitions assigned to the second user-defined keys 50*a* to 50*d*. By a manipulation of one of the user-defined keys, a function assigned to the manipulated user-defined key is executed. By a manipulation of the edit key 52, a setup screen on which the display size and the like of the first user-defined key are specified is displayed on a separate main display 14*a*, 14*b*.

3 Claims, 8 Drawing Sheets

MIXING CONSOLE WITH TOUCH PANELS FOR MANAGING USER-DEFINED KEYS

BACKGROUND OF THE INVENTION

1. Field of the Invention

The present invention relates to a mixing console having a sub-display which displays user-defined keys.

2. Description of the Related Art

Conventionally, there have been mixing consoles for use in a concert hall or the like, the conventional mixing consoles controlling respective levels and frequency responses of audio signals output from a multiplicity of microphones and electric/electronic musical instruments placed on a stage or the like, mixing the controlled signals, and then transmitting the mixed signals to a power amplifier. By use of various kinds of panel operating elements provided on the conventional mixing console, a user of the mixing console controls respective tone volumes and tone colors of audio signals representative of tones of musical instruments and vocals to realize a state in which performances are most suitably represented. The mixing console has buses for mixing sound signals input from input channels, and output channels for outputting the mixed sound signals. The respective input channels control frequency response and mixing level of sound signals input to the input channels, and then output the controlled sound signals to the mixing buses. The mixing buses mix the input sound signals, and then output the mixed signals to their respective output channels. Respective outputs from the output channels are amplified to be emitted by speakers and the like.

The conventional mixing console is provided with user-defined keys to which a user can assign user's desired functions. As the user-defined keys, fixed hardware keys provided on a physical panel are used. An example of such user-defined keys is indicated in FIG. 10. An area where the user-defined keys indicated in FIG. 10 are provided is placed in a certain area of a physical panel 100. In the area, for example, user-defined keys 101 numbered 1 through 8 are arranged in two rows each having four user-defined keys from side to side. By manipulating one of the user-defined keys 101, a corresponding function assigned by the user to the manipulated user-defined key 101 is executed. In order to show the user the correspondences between the user-defined keys 101 and the assigned functions at a glance, the user is required to place notes such as vinyl tape on the physical panel 100 so that the user can write down respective names of the assigned functions on the tape with a pen or to keep displaying, on a main panel, a window dedicated to the display of the correspondences between the user-defined keys 101 and the names of the assigned functions.

In order to solve the above-described problem, there have been various conventional schemes in which user-defined keys are displayed on a touch panel display (e.g., Japanese Unexamined Patent Publication No. 2008-252369). One of the conventional schemes is designed such that a plurality of keys which serve as user-defined keys are displayed in the same display pattern, with the user-defined keys being assigned user's selected functions, respectively. The other conventional scheme is designed such that user-defined keys which are adjacent to each other, and to which functions correlated with each other are assigned are grouped so that the user-defined keys of each group will be displayed in a display pattern shared by the user-defined keys of the group.

SUMMARY OF THE INVENTION

On the conventional mixing console, the user-defined keys are provided in a certain area, with the number of user-defined keys being fixed. Since the conventional scheme does not allow the assignment of user-definitions which exceeds the fixed number, bank switch keys are provided in order to equivalently increase the user-defined keys. By switching among the banks, each of the user-defined keys can be assigned different functions. By the employment of the bank switch keys, therefore, the conventional scheme enables the assignments of the number of user-definitions obtained by multiplying the number of user-defined keys by the number of banks. On the conventional mixing console employing the touch panel display on which the user-defined keys are displayed, however, the switching among the banks has to be done on a screen where various settings are made, requiring user's complicated manipulations.

The present invention was accomplished to solve the above-described problem, and an object thereof is to provide a mixing console which enhances operability of user-defined keys displayed on a sub-display.

In order to achieve the above-described object, it is the primary feature of the present invention to provide a mixing console including a main display; a sub-display which has a touch panel capability, and displays a plurality of first user-defined keys, a bank switch key and an edit key which are software keys; a plurality of second user-defined keys which are hardware keys arranged near the sub-display as if an arrangement of the first user-defined keys were extended; and a processor for executing, in response to a manipulation of one of the first user-defined keys or the second user-defined keys, a function assigned to the manipulated user-defined key, wherein in response to a manipulation of the bank switch key to switch a bank to a different bank, the first user-defined keys and the second user-defined keys switch their respective functions to those corresponding to the different bank, whereas in response to a manipulation of the edit key displayed on the sub-display, the main display shows a user-defined key setup screen on which at least a desired display size of the first user-defined key is specified.

By employing the user-defined keys arranged on the sub-display having the touch panel capability, the mixing console according to the present invention allows a user to specify the respective display sizes of at least the first user-defined keys which are software keys, enhancing operability. On the mixing console of the present invention, furthermore, the user-defined keys which are hardware keys arranged as if the arrangement of the user-defined keys which are the software keys were extended can be used by the user in much the same way the software keys are used. Consequently, the mixing console of the present invention avoids erroneous operations caused by false detection of a touch, ensuring accurate operations.

DESCRIPTION OF THE PREFERRED EMBODIMENT

Figure 1:
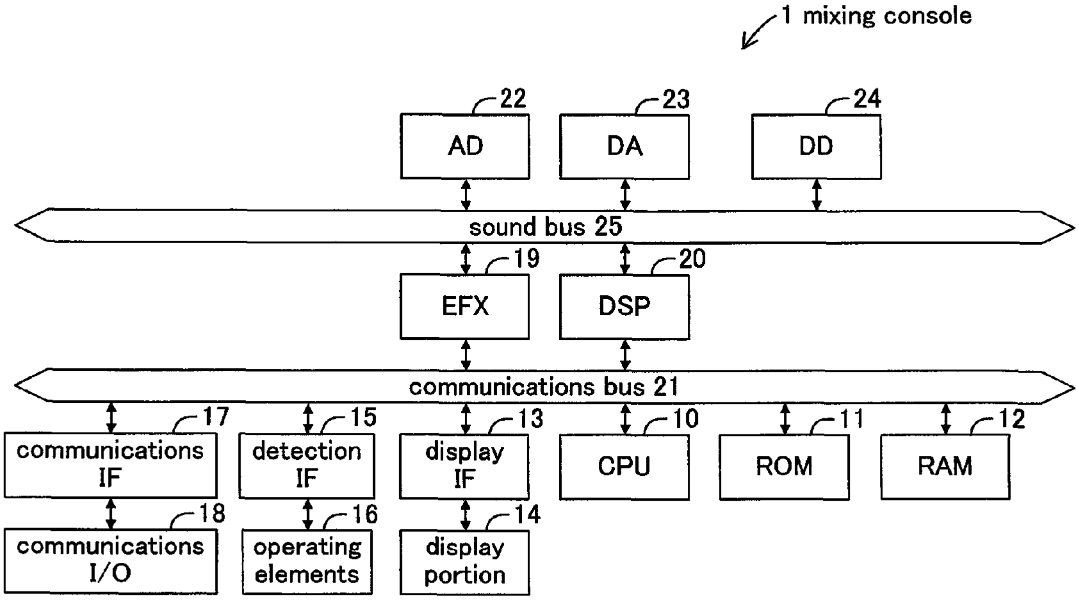
FIG. 1 is a block diagram indicative of a configuration of a mixing console according to an embodiment of the present invention.

FIG. 1 is a block diagram indicative of a configuration of a mixing console according to an embodiment of the present invention. On a mixing console 1 indicated in FIG. 1, a CPU (central processing unit) 10 carries out a control program (OS: operating system) to control the entire mixing console 1 by the OS. The mixing console 1 has a nonvolatile ROM (read-only memory) 11 which stores operating software such as a mixing control program executed by the CPU 10, and a RAM (random-access memory) 12 which functions as working areas of the CPU 10 and stores various kinds of data. The CPU 10 carries out the mixing control program to allow a DSP (digital signal processor) 20 to process input sound signals to perform mixing processing. By employing a rewritable ROM such as a flash memory as the ROM 11, the operating software can be rewritten to facilitate updates of the operating software. Under the control of the CPU 10, the DSP 20 controls the respective tone volume levels and frequency responses of the input sound signals on the basis of set parameters, and mixes the sound signals to perform digital signal processing which controls sound characteristics such as tone volume, pan and effect on the basis of the parameters. An effector (EFX) 19 adds effects such as reverb, echo and chorus to the mixed audio signals under the control of the CPU 10.

Figure 3:
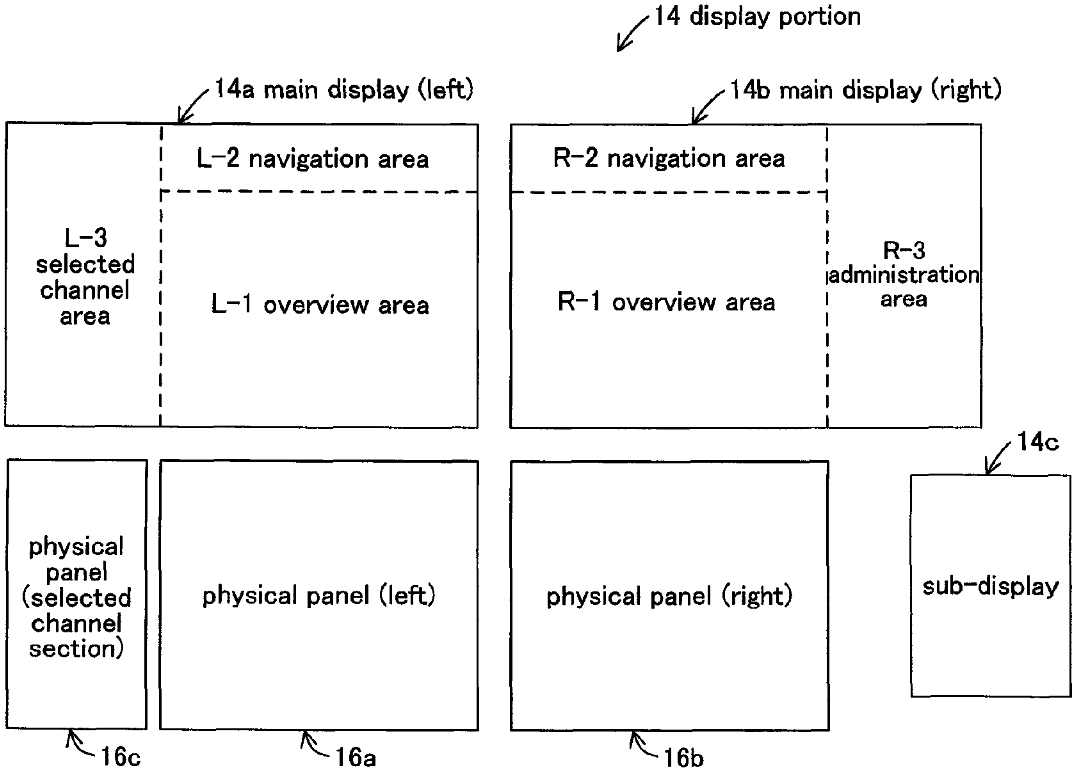
FIG. 3 is a configuration of a display portion of the mixing console of the present invention and a configuration of operating elements placed on a panel.

A display IF 13 is an interface for displaying a screen of various contents relating to mixing on a display portion 14. The display portion 14 is formed of main displays 14*a*, 14*b* each having a touch panel capability and a sub-display 14*c* having a touch panel capability as indicated in FIG. 3. A detection IF 15 scans operating elements 16 such as faders, knobs and switches provided on a panel of the mixing console 1 to detect user's manipulations of the operating elements 16 to edit or manipulate parameters used for sound signal processing on the basis of the detected manipulation signals. A communications IF 17, which is an interface for allowing the mixing console 1 to communicate with an external apparatus through a communications I/O 18, is a network interface such as Ethernet (trademark). The CPU 10, the ROM 11, the RAM 12, the display IF 13, the detection IF 15, the communications IF 17, the EFX 19 and the DSP 20 transmit and receive data and the like with each other through a communications bus 21.

The EFX 19 and the DSP 20 transmit/receive data and the like to/from an AD 22, a DA 23 and a DD 24 through a sound bus 25. The AD 22 is a plurality of analog input ports for inputting analog signals to the mixing console 1. The analog input signals input to the AD 22 are converted into digital signals before being transmitted to the sound bus 25. The DA 23 is a plurality of analog output ports for outputting mixed signals which have been mixed from the mixing console 1 to the outside. Digital output signals received by the DA 23 through the sound bus 25 are converted into analog signals before being output from speakers placed in a venue or on a stage. The DD 24 is a plurality of digital input/output ports for inputting digital signals to the mixing console 1 and outputting mixed digital signals to the outside. The digital input signals input by the DD 24 are transmitted to the sound bus 25, whereas the digital output signals received through the sound bus 25 are output to a digital recorder or the like. The digital signals transmitted from the AD 22 and the DD 24 to the sound bus 25 are received by the DSP 20 to be digitally processed as described above. The mixed digital signals transmitted from the DSP 20 to the sound bus 25 are received by the DA 23 or the DD 24.

Figure 2:
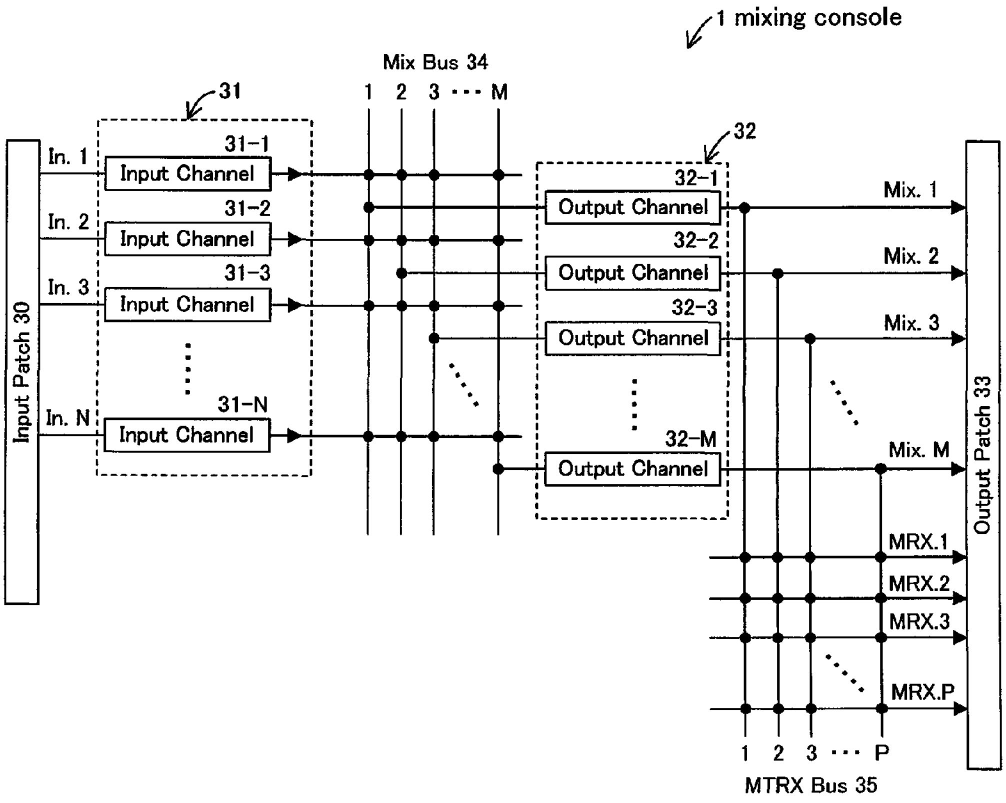
FIG. 2 is a block diagram indicative of an equivalent hardware configuration of a mixing algorithm executed on the mixing console of the present invention.

FIG. 2 is a block diagram indicative of an equivalent hardware configuration of a mixing algorithm executed on the mixing console 1. In FIG. 2, a plurality of analog signals input to the plurality of analog input ports (AD 22) are converted into digital signals before being input to an input patch 30. A plurality of digital signals input to the plurality of digital input port (DD 24) are directly input to the input patch 30. In the input patch 30, each of the input ports from which signals were input is selectively patched (connected) to one of input channels 31-1, 31-2, 31-3, . . . , 31-N included in an input channel portion 31 having N channels (N is an integer which is 1 or more: 96 channels, for example). To the respective input channels 31-1 to 31-N, audio signals In. 1, In. 2, In. 3, . . . , In. N transmitted from the respective input ports patched by the input patch 30 are supplied.

As for respective input channel signals supplied to the respective input channels 31-1 to 31-N of the input channel portion 31, characteristics of sound signals are controlled by an equalizer and compressor, with respective sending levels being controlled. The signals are then transmitted to a mixing bus (Mix Bus) 34 having M buses (M is an integer which is 1 or more: 24 buses, for example). In this case, the N input channel signals output by the input channel portion 31 are selectively output to one or more of the M buses of the mixing bus 34. In the respective buses of the mixing bus 34, one or more input channel signals selectively input from the input channel(s) included in the N input channels are mixed, resulting in a total of M different mixed outputs. The respective mixed outputs output from the respective buses of the M mixing bus 34 are output to respective output channels 32-1, 32-2, 32-3, . . . , 32-M included in an output channel portion 32 having M channels. In the respective output channels 32-1 to 32-M, characteristics of sound signals such as frequency balance are controlled by the equalizer and compressor before being output as output channel signals Mix. 1, Mix. 2, Mix. 3, . . . , Mix. M. The M output channel signals Mix. 1 to Mix. M are output to an output patch 33.

One or more of the M output channel signals Mix. 1 to Mix. M output from the output channel portion 32 are selectively transmitted to an MTRX bus 35 having P buses (P is an integer which is 1 or more: 8 buses, for example) which are matrix buses. In each of the P buses of the MTRX bus 35, one or more of the output channel signals selectively input from the output channel(s) included in the M output channels are mixed, resulting in a total of P different mixed outputs MRX. 1, MRX. 2, MRX. 3, . . . , MRX. P being output to an output patch 33. By the MTRX bus 35, as described above, sub-mixed signals MRX. 1 to MRX. P obtained by further mixing (sub-mixing), in the P different buses, the signals mixed by the mixing bus 34 are output. The sub-mixed signals can be used in the following case: In a case of a concert hall where music is played, with the first output channel being assigned vocal, the second output channel being assigned guitar, the third output channel being assigned drums, and the like, it is preferable that sound signals which are to be emitted from speakers placed in a lobby and hallways of the concert hall are the signals obtained by mixing the vocal, guitar, drums and the like. By mixing, by the MTRX bus 35, the output channel signals Mix. 1 to Mix. M representative of the vocal, guitar, drums and the like output by the output channel portion 32, therefore, the sub-mixed signals MRX. 1 to MRX. P output by the MTRX bus 35 can be emitted from the speakers placed in the lobby and the hallways.

The output patch 33 selectively patches (connects) each of the M output channel signals Mix. 1 to Mix. M output by the output channel portion 32 and the P sub-mixed signals MRX. 1 to MRX. P output by the MTRX bus 35 to one of the plurality of output ports (the DA 23 and DD 24). To the respective output ports, the output channel signals patched by the output patch 33 are supplied. In the output ports of the DA 23, digital output channel signals are converted to analog output signals to be amplified by an amplifier before being emitted from speakers placed in the venue. The analog output signals can be also supplied to in-ear monitors worn by musicians and the like performing on a stage, or reproduced by stage monitoring speakers placed near the musicians. Digital audio signals output by the digital output port portion (the DD 24) having a plurality of digital output ports can be supplied to a recorder or an externally connected DAT so that the digital audio signals can be digitally recorded.

FIG. 3 indicates a configuration of the display portion 14 of the mixing console 1 of the present invention and a configuration of the operating elements 16 provided on the panel. The display portion 14 is formed of main displays having the main display (left) 14*a* and the main display (right) 14*b* which are touch panels, and the sub-display 14*c* which is also a touch panel. Below the main display (left) 14*a*, a physical panel (left) 16*a* having the operating elements 16 forming channel strips of eight channels, for example, is provided. Below the main display (right) 14*b*, a physical panel (right) 16*b* having the operating elements 16 forming channel strips of eight channels, for example, is provided. On the left of the physical panel (left) 16*a*, a physical panel (selected channel section) 16*c* having the operating elements 16 is provided. The main displays offer intuitive manipulation on the touch panels to the user. On each main display, more specifically, respective areas for displaying screens for making various settings and a screen for manipulation are distinguished clearly. By displaying only necessary information only when the information is required, therefore, the mixing console 1 of the present invention enables intuitive manipulation, also preventing user's erroneous manipulation on the touch panels.

More specifically, the central area of the main display (left) 14*a* is an overview area L-1 where a screen for making various settings is displayed. On the overview area L-1, the channel strips of the eight channels provided on the physical panel (left) 16*a* are to be handled. The channel strips are designed such that image operating elements displayed on the main display (left) 14*a* are vertically linked seamlessly to the operating elements 16 provided on the physical panel (left) 16*a*, as displayed in a later-described example screen indicated in FIG. 4. An area situated above the overview area L-1 is a navigation area L-2 where a screen for setting various settings is displayed. On the navigation area L-2, the user selects a channel block which is to be assigned to the physical panel (left) 16*a*. Each channel block is formed of a certain number of channels such as eight channels. The navigation area L-2 displays all the channel blocks at all times so that the user can touch a user's desired channel block to assign the desired channel block to the overview area L-1 and the physical panel (left) 16*a*. Each channel block always displays input/output meters and fader positions in order to provide the user the outline of the channels of each block.

An area situated on the left of the overview area L-1 and the navigation area L-2 is a selected channel area L-3 where a screen for manipulation is displayed. The selected channel area L-3 displays image operating elements which allow the user at all times to manipulate important parameters of a currently selected channel. The selected channel area L-3 is designed to work with the physical panel (selected channel section) 16*c*, so that the user can manipulate, with the operating elements 16 provided on the physical panel 16*c*, all the items which require real-time operation of a channel assigned to the selected channel area L-3. The selected channel area L-3 displays those channel parameters which cannot be represented by the physical panel (selected channel section) 16*c*. Such channel parameters can be roughly grouped under "parameters for making a tone itself", "parameters for routing" and "other parameters". Without depending on respective states of the other areas in principle, the selected channel area L-3 always allows user's manipulations on the parameters of an assigned channel and displays the parameters of the assigned channel.

A central area of the main display (right) 14*b* is an overview area R-1 where a screen for making various settings is displayed. Because the overview area R-1 is designed similarly to the overview area L-1, the explanation about the overview area R-1 will be omitted. An area situated above the overview area R-1 is a navigation area R-2 where a screen for making various settings is displayed. Because the navigation area R-2 is designed similarly to the navigation area L-2, the explanation about the navigation area R-2 will be omitted. An area situated on the right of the overview area R-1 and the navigation area R-2 is an administration area R-3 where a screen for manipulation is displayed. The administration area R-3 serves as an area for the entire control to govern the entire modes of the mixing console 1, without depending on respective states of the other areas. Functions which cannot be represented by the parameters of the channels such as configuration on the mixing console 1 are to be invoked on the area.

Figure 4:
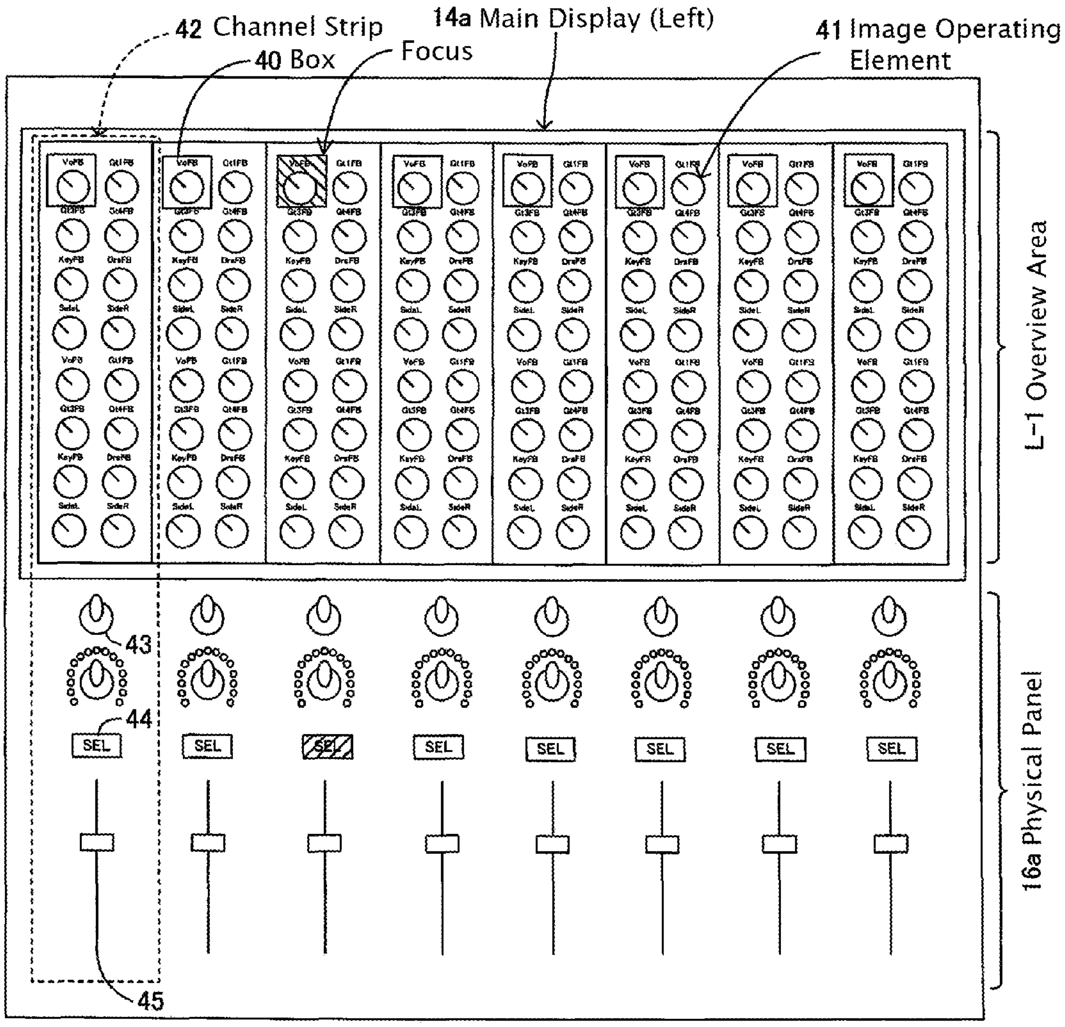
FIG. 4 is an example screen displayed on a main display of the mixing console of the present invention.

FIG. 4 indicates an example screen displayed on the main display of the mixing console 1 of the present invention. In FIG. 4, an example screen of the overview area L-1 displayed on the main display (left) 14*a* and the configuration of the physical panel (left) 16*a* are indicated. The overview area R-1 of the main display (right) 14*b* displays a similar screen, with the physical panel (right) 16*b* being configured similarly.

The overview area L-1 of the main display (left) 14*a* indicated in FIG. 4 displays image operating elements 41 provided for respective parameters provided for each of the eight channels which configure the channel block assigned to the area. Each channel has the sixteen image operating elements 41 arranged in two lines to extend vertically. To the image operating elements 41 of each channel, parameters which are important to the channel and parameters which are to be handled in real time are assigned, respectively. Each channel's image operating elements 41 arranged in the vertical direction displayed on the overview area L-1 are linked seamlessly to the operating elements 16 which are arranged in the vertical direction and are provided on the physical panel (left) 16*a*, resulting in a channel strip 42 corresponding to the channel. FIG. 4 indicates a case where the channel strips 42 are provided for the eight channels. When the user touches one of the image operating elements 41 displayed on the overview area L-1, a parameter assigned to the touched image operating element 41 is to be selected. When the user touches the image operating element 41 assigned to the parameter "VoFB" of a channel, for example, the parameter "VoFB" is to be selected, so that boxes 40 enclosing the respective image operating elements 41 corresponding to the selected parameter are displayed. By touching one of the image operating elements 41, therefore, the parameter corresponding to the image operating element 41 is to be selected on each channel displayed on the overview area L-1, resulting in the boxes 40 enclosing the respective image operating elements 41 of the parameter "VoFB" provided for the respective channels being overlaid on the operating elements 41, respectively.

Once the parameter is selected as described above, the user is able to change the value of the selected parameter by manipulating an operating element 43 provided at the top of the physical panel (left) 16*a*. The parameter value which is to be changed is the selected parameter of a channel assigned to the channel strip 42 which has the manipulated operating element 43. The user is allowed to edit parameters by use of the operating elements 43 regardless of contents displayed on the sub-display 14*c*. If the user manipulates one of SEL keys 44 provided on the physical panel (left) 16*a*, the selected channel area L-3 and the physical panel (selected channel section) 16*c* are assigned the channel assigned to the channel strip 42 which has the manipulated SEL key 44. By manipulating the operating elements 16 provided on the physical panel (selected channel section) 16*c*, therefore, the user is able to edit the parameters of the assigned channel. By manipulating one of the channel faders 45 provided on the physical panel (left) 16*a*, the user is able to control the level of the channel assigned to the channel strip 42 which has the manipulated channel fader 45.

In the example of FIG. 4, the SEL key 44 of channel 3 which is the third channel from the left on the physical panel (left) 16*a* has been selected to illuminate. From among the selected parameters "VoFB", therefore, the parameter "VoFB" of the channel 3 is selected to be focused. That is, the focused parameter "VoFB" is regarded as a target parameter which is to be controlled, with a sub-menu (context menu) formed of manipulation items relating to the target parameter, or an image for input (context pad) being displayed on the sub-display 14*c* at all times. Display modes of the sub-display 14*c* include a context menu mode and a context pad mode. In the context menu mode, the sub-display 14*c* displays a context menu formed of items of ancillary operating functions such as copy and paste of the focused parameter. The items included in the context menu vary according to the type of a focused parameter. In the context pad mode, the sub-display 14*c* displays, as a context pad, a software keyboard for inputting a numeric value to the focused parameter or a screen of surround pan in a case where the focused parameter is about pan. The number of parameters which can be specified by the focusing is one. That is, the sub-display 14*c* displays at all times, the context menu or the context pad for a focused parameter. The manner in which the sub-display 14*c* displays the screen will be described later.

Figure 5:
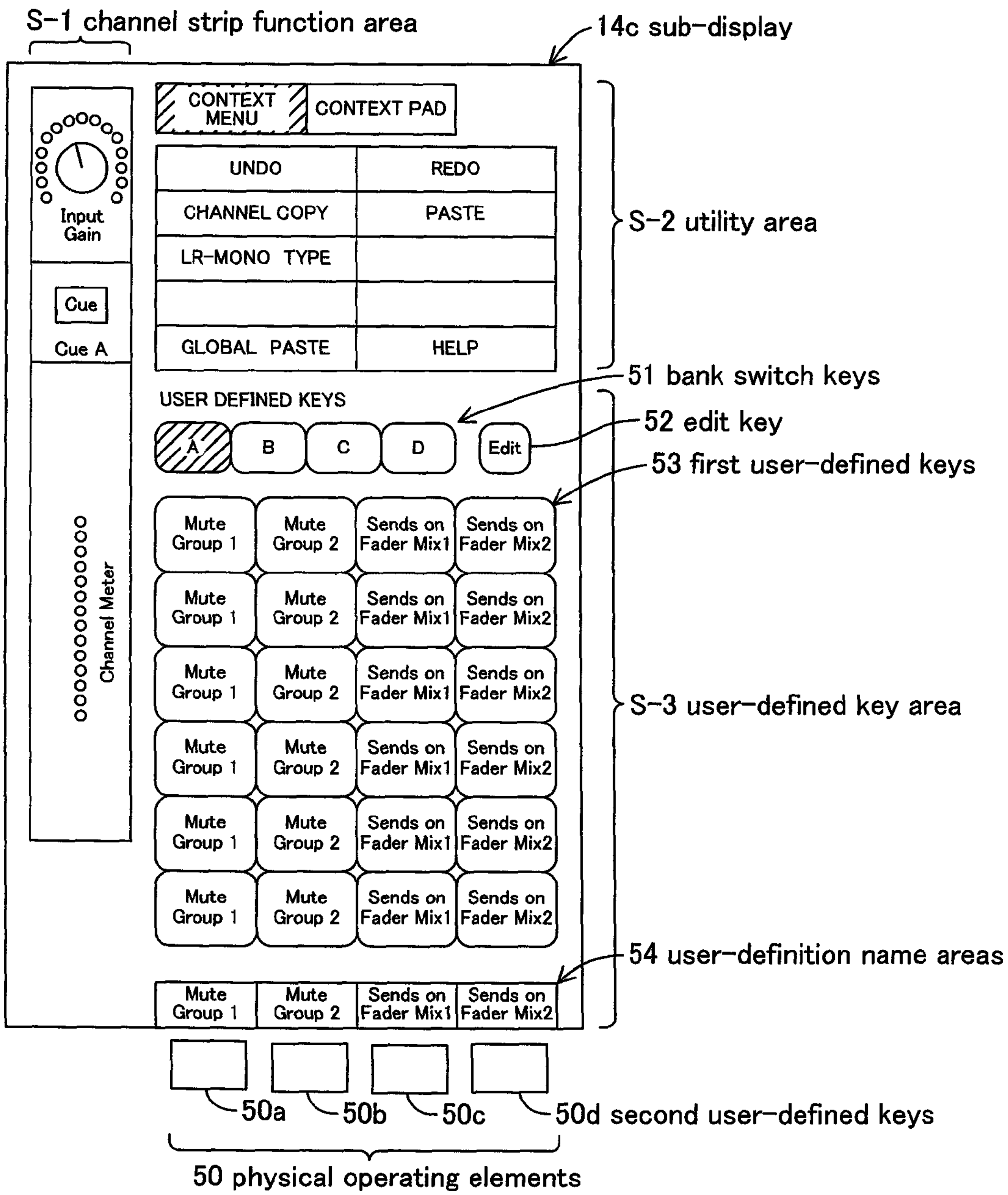
FIG. 5 is an example screen displayed on a sub-display of the mixing console of the present invention.

FIG. 5 indicates an example screen of the sub-display 14*c*. The sub-display 14*c* serves as an ancillary display portion provided in order to support user's manipulation of the main displays 14*a*, 14*b* to improve operability for the user. The sub-display 14*c* is a touch panel which offers intuitive operability.

As indicated in FIG. 5, the sub-display 14*c* has three display areas: a left narrow channel strip function area S-1, an upper utility area S-2 and a user-defined key area S-3. The channel strip function area S-1 is assigned the operating elements corresponding to ASSIGNABLE FUNCTION ENCODER, Fn KEY, CUE KEY, and CHANNEL METER, respectively, included in the channel strip which has the focused parameter. More specifically, the channel strip function area S-1 displays functions which vary according to the focused parameter. In the case of FIG. 5, the channel strip function area S-1 displays a state where the ASSIGNABLE FUNCTION ENCODER is assigned Input Gain, with the CUE KEY and the CHANNEL METER also being displayed without displaying the Fn KEY (Function KEY). By user's touch of either the "context menu tab" or the "context pad tab" provided on the top of the utility area S-2, the utility area S-2 displays either the context menu or the context pad, depending on the tab that the user has touched. The utility area S-2 displays a context menu or a context pad for the parameter focused on the main display 14*a*, 14*b*. In the case of FIG. 5, the utility area S-2 is in the context menu mode to display the context menu. The context pad has an interface for inputting a value directly.

In the user-defined key area S-3, twenty four first user-defined keys 53 which are software keys are arranged on the screen. Above the first user-defined keys 53, four bank switch keys 51 for switching among banks A, B, C and D are arranged in a lateral direction. Next to the bank switch keys 51, an edit key 52 is provided. In the shown example, the key of bank A illuminates to indicate that bank A has been selected. In the user-defined key area S-3, each row has four first user-defined keys 53, while each line has six first user-defined keys 53. Immediately bellow the sub-display 14*c*, in addition, a physical operating element 50 formed of four of second user-defined keys 50*a*, 50*b*, 50*c*, 50*d* is arranged in the lateral direction. The second user-defined keys 50*a* to 50*d* are hardware keys that can illuminate. The second user-defined keys 50*a* to 50*d* are arranged as if the arrangement of the first user-defined keys 53 were extended downward so that the second user-defined keys can be aligned with the first user-defined keys 53, respectively, in the vertical direction.

Since the user is allowed to assign user's desired functions to these user-defined keys, respectively, user-definitions of up to 28×4 banks can be assigned to the user-defined keys. On each of the first user-defined keys 53, the name of a user-definition having a function assigned to the first user-defined key 53 is displayed. Because the second user-defined keys 50*a* to 50*d* which are hardware keys are not able to display respective assigned functions, user-definition name areas 54 are provided at the bottom of the user-defined key area S-3 so that respective names of user-definitions having functions assigned to the second user-defined keys 50*a* to 50*d* can be displayed in the user-definition name areas 54 in a correlated manner. In the user-defined key area S-3, as described above, desired functions defined by the user are assigned to the GUI first user-defined keys 53 which are the software keys and the second user-defined keys 50*a* to 50*d* which are the hardware keys. By a user's touch of one of the first user-defined keys 53 or by a user's depression of one of the second user-defined keys 50*a* to 50*d*, a function corresponding to the user's selected user-defined key is executed.

Figure 6:
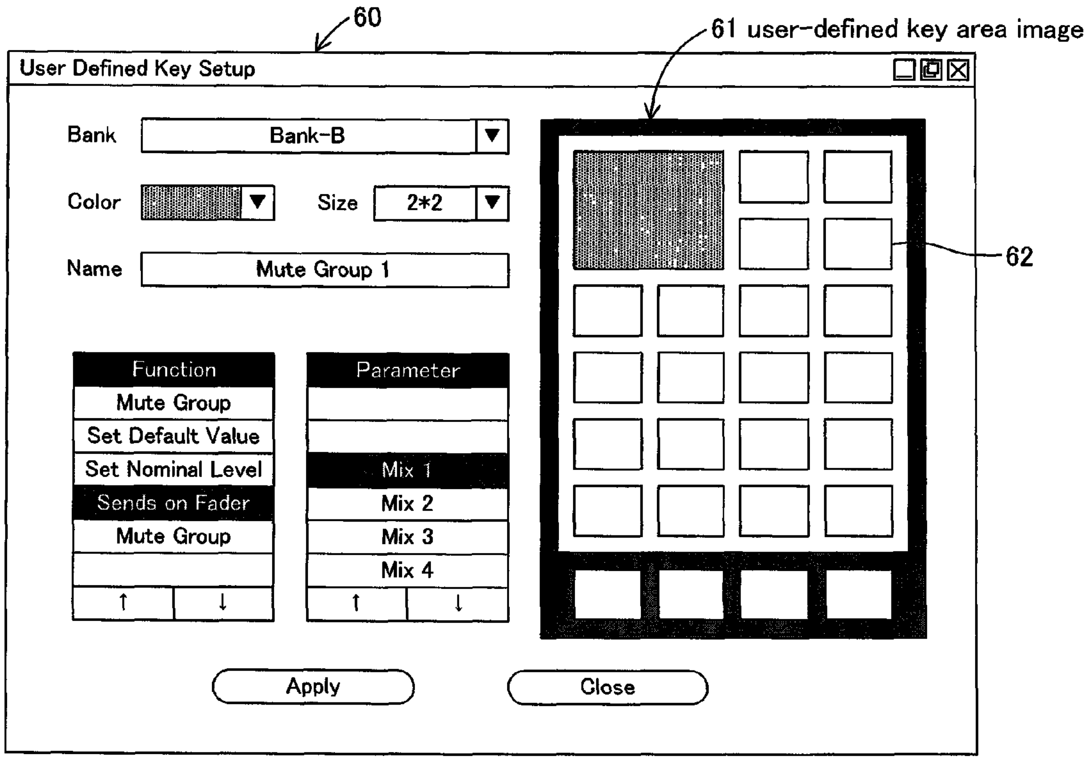
FIG. 6 is a display manner of a user-defined key setup screen displayed on the main display of the mixing console of the present invention.

By a user's touch of the edit key 52, a setup screen (user-defined key setup) 60 for setting up the user-defined key is displayed on the main display. The setup screen 60 is indicated in FIG. 6. On the setup screen 60 of FIG. 6, the user sets up a user-defined key selected from among the first user-defined keys 53 displayed on the user-defined key area S-3 and the second user-defined keys 50*a* to 50*d*. As long as the setup screen 60 is displayed on the main display, the user is allowed to select a user-defined key which will be set up on the setup screen 60 by touching the user's desired user-defined key 53 displayed on the user-defined key area S-3 of the sub-display 14*c* or depressing the user's desired second user-defined key 50*a* to 50*d*. The user-defined key which has been selected to be a target for the setting up is displayed brightly. In a case where the selected user-defined key is one of the second user-defined keys 50*a* to 50*d* which are the hardware keys, the user-definition name area 54 corresponding to the selected user-defined key is displayed brightly. While the setup screen 60 is displayed on the main display, manipulations of any user-defined key will not result in the execution of the function assigned to the manipulated user-defined key.

The setup screen 60 indicated in FIG. 6 displays items of "Bank", "Color", "Size", "Name", "Function", and "Parameter", and a user-defined key area image 61 placed on the right of these items. In the item of "Bank", the user selects a bank to which the selected user-defined key is to belong. In the item of "Color", the user selects a color in which the selected user-defined key is to be displayed. In the item of "Size", the user specifies the vertical and horizontal size of the selected user-defined key. In the item of "Name", the user specifies the name of a user-definition displayed for the selected user-defined key. In the case where the selected user-defined key is one of the second user-defined keys 50*a* to 50*d* which are the hardware keys, the item of "Size" will be grayed out to disable the specification of the size. In the item of "Color", however, the user is to select a color in which the corresponding user-definition name area 54 is to be displayed. In the item of "Name", in addition, the user is to specify the name of a user-definition which is to be displayed on the corresponding user-definition name area 54. In the item of "Function", furthermore, the user selects a function which is to be assigned to the selected user-defined key. In the item of "Parameter", the user selects a parameter of the selected function.

On the user-defined key area image 61, an image of the user-defined key area S-3 indicated in FIG. 5 is displayed to show respective states of the user-defined keys whose items have been set as described above. FIG. 6 indicates a state in which the user-defined key placed in the upper left corner has been selected. In the case of FIG. 6, "Bank-B" is selected for the selected user-defined key. The item of "Size" which is specified on the basis of the respective numbers of cells arranged in the vertical and horizontal directions shows "2*2", so that the size of the selected user-defined key occupies two cells both in the vertical and horizontal directions as indicated in FIG. 6. The user is allowed to specify respective sizes of the user-defined keys. It is preferable, therefore, that user-defined keys to which important functions are assigned have larger sizes. In addition, the selected user-defined key is to be displayed in the color specified in the item of "Color". The name of the user-definition of the selected user-defined key is specified as "Mute Group 1". To the selected user-defined key, furthermore, "Sends on Fader" set in the item of "Function" is assigned, with "Mix. 1" being selected in the item of "Parameter". After the completion of the setting up, a user's touch of the button of "Apply" displayed at the bottom of the setup screen 60 results in an update of a current memory of the RAM 12 with the contents that the user has set. By a touch of the button of "Close", however, the set contents are canceled to close the setup screen 60. In the item of "Size" of each user-defined key, the selectable shape is only a rectangle. More specifically, the user is not allowed to choose a rectangle having a hole, a projection or a depression.

Figure 7:
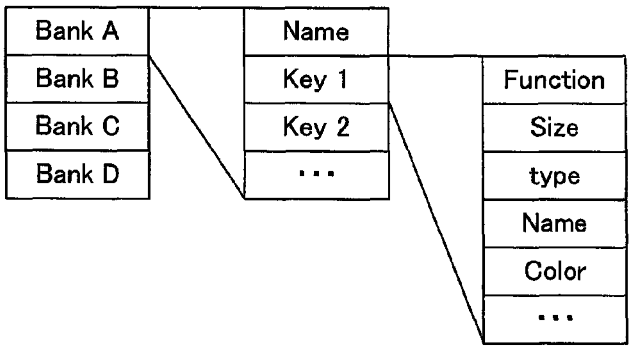
FIG. 7 is a memory image of user-definitions used on the mixing console of the present invention.

FIG. 7 indicates a memory image (data structure) of the user-defined keys stored in the RAM 12 of the mixing console 1 of the present invention. As indicated in FIG. 7, the user-defined keys are separated into four banks of Bank A, Bank B, Bank C, and Bank D. Each bank includes information about the name of the bank (Name) and the user-defined keys (Key 1, Key 2, etc.) belonging to the bank. The maximum number of user-defined keys is 28 (Key 28). The information about each user-defined key includes information about "Function", "Size", "Type", "Name", "Color", etc. which can be specified on the setup screen 60. "Type" is information representative of the type of a user-defined key such as a type of a user-defined key which is to be turned on/off, or a type of a user-defined key which is enabled during the depression (touch) of the user-defined key or during the release of the key.

Figure 8:
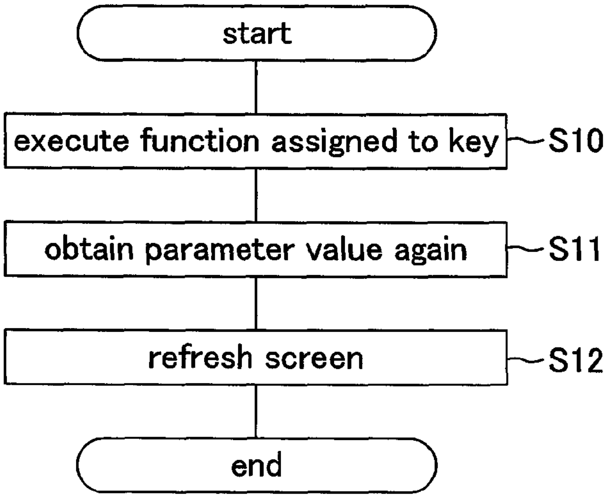
FIG. 8 is a flowchart of a function execution process for executing a function of a user-defined key, the process being carried out on the mixing console of the present invention.

FIG. 8 is a flowchart of a function execution process carried out on the mixing console 1 of the present invention. By a touch of one of the first user-defined keys 53 or a depression of one of the second user-defined keys 50*a* to 50*d*, the function execution process starts. In step S10, a function assigned to the manipulated user-defined key is executed. For confirmation of a parameter value affected by the function executed in step S10, the parameter value is obtained again in step S11. In step S12, the screen is refreshed so that the manipulated user-defined key will be displayed brightly. After step S12, the function execution process terminates. In a case where the selected user-defined key is one of the second user-defined keys 50*a* to 50*d* which are the hardware keys, the screen is refreshed so that the user-definition name area 54 corresponding to the selected second user-defined key will be displayed brightly.

Figure 9:
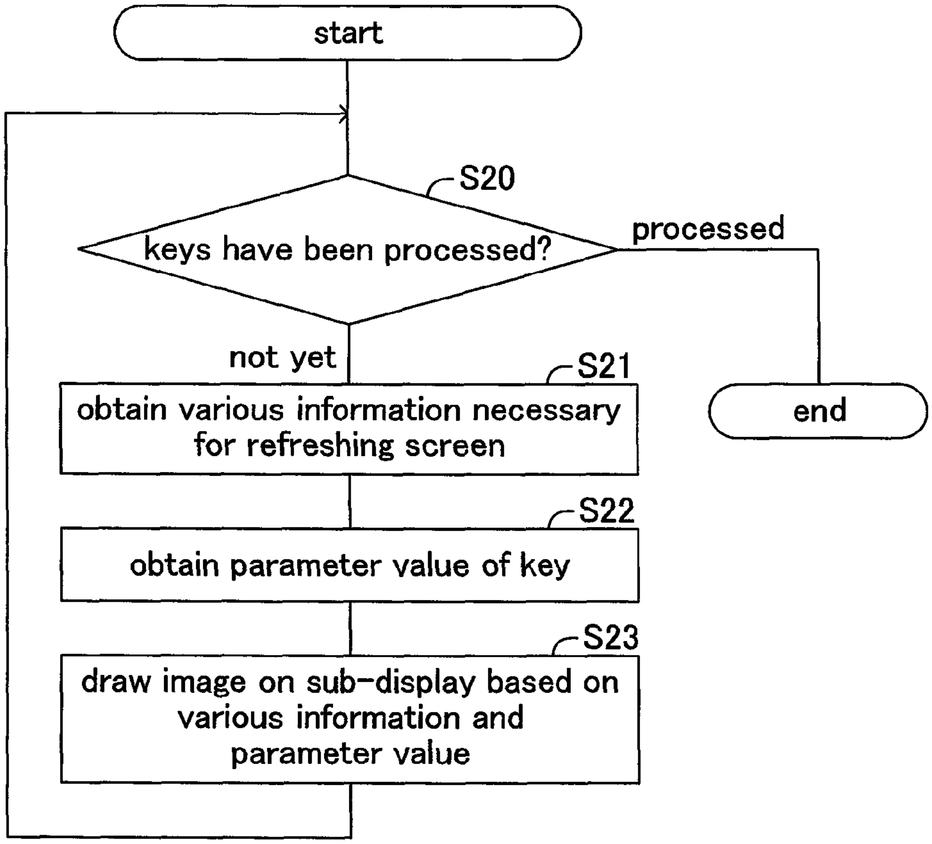
FIG. 9 is a flowchart of a bank switching process for switching among banks to which the user-defined keys belong, the process being carried out on the mixing console of the present invention.
Figure 10:
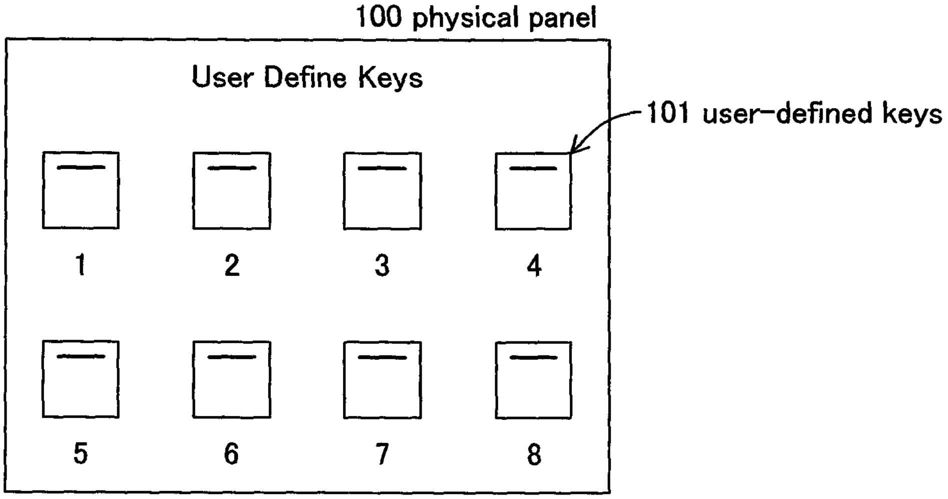
FIG. 10 is an example of user-defined keys used on a conventional mixing console.

FIG. 9 is a flowchart of a bank switching process carried out on the mixing console 1 of the present invention. By a user's touch of one of the bank switch keys 51 displayed on the user-defined key are S-3, the bank switching process starts. In step S20, it is determined whether all the user-defined keys belonging to the selected bank which has been touched by the user have been processed or not. Until it is determined that all the user-defined keys have been processed, the process gives "not yet" to proceed to step S21 to obtain various kinds of information necessary for refreshing the screen. In a case where the user-defined key for which the various kinds of information is to be obtained is the first user-defined key 53 which is the software key, the information about size, display color, name of a user-definition is to be obtained. In a case where the user-defined key for which the various kinds of information is to be obtained is one of the second user-defined keys 50*a* to 50*d* which are the hardware keys, the information about display color and name of a user-definition which are to be displayed on the user-definition area 54 corresponding to the user-defined key is to be obtained. In step S22, the parameter value of the user-defined key whose various kinds of information has been obtained is obtained. In the case where the user-defined key whose information and parameter value have been obtained is a software key, the user-defined key 53 is drawn in the user-defined key are S-3 provided on the sub-display 14*c* on the basis of the various information obtained in step S21 and the parameter value obtained in step S22. In the case where the user-defined key whose information and parameter value have been obtained is a hardware key, the user-defined name area 54 corresponding to the user-defined key is drawn in the user-defined key area S-3. The steps S20 to S23 are iterated until all the user-defined keys belonging to the selected bank have been processed. When all the user-defined keys have been processed, it is determined in step S20 that all the user-defined keys have been processed, so that the bank switching process terminates.

The above-described mixing console is designed to have the touch panel sub-display which displays the first user-defined keys, the bank switch keys and the edit key which are the software keys, as well as the main displays. Immediately below the sub-display, the second user-defined keys which are the hardware keys arranged as if the arrangement of the first user-defined keys were extended are provided. On the sub-display, furthermore, the user-definition name areas for displaying respective names of user-definitions assigned to the second user-defined keys are displayed so that the user-definition name areas are correlated with the second user-defined keys, respectively. By a user's manipulation of one of the first user-defined keys or the second user-defined keys, a function assigned to the manipulated user-defined key is executed. By a manipulation of the edit key, the setup screen for setting the various items, such as display size, relating to the first user-defined keys is displayed on the main display.

Although the present invention has been described as an invention of the mixing console, the present invention is not limited to the mixing console. That is, any sound apparatuses can be employed as long as they have two or more input channels, and mix sound signals input to the input channels to output the mixed signals. Furthermore, the mixing console of the present invention is designed such that the sixteen image operating elements 41 provided for each channel are arranged in two columns on the overview area. However, the arrangement of the image operating elements 41 is not limited to that of the present invention. That is, the number of operating elements 41 provided for each channel may be less than 16, or more than 16. Furthermore, the user-defined key area has 24 user-defined keys. However, the number of user-defined keys is not limited to 24. That is, the number of user-defined keys may be less than 24, or more than 24.

What is claimed is:

1. A mixing console comprising:

a first display having a first touch screen area;

a second display, physically separate from the first display, the second display having a second touch screen area;

a microprocessor programmed to execute a display control task that displays in the second touch screen area a plurality of first user-defined keys, a bank switch key, and an edit key; and a plurality of second user-defined hardware keys arranged adjacent to the second touch screen area, and aligned with the first user-defined keys wherein the microprocessor is further programmed to execute a processing task that:

in response to a manipulation of one of the first or second user-defined keys, executes a function assigned to the one manipulated user-defined key; and in response to a manipulation of the bank switch key for switching a bank to a different bank, assigns functions provided by the different bank to the first user-defined keys and the second user-defined keys; and in response to a manipulation of the edit key, displays on the first touch screen area, a key setup screen on which at least a desired display size of the first user-defined key is specified.

2. A mixing console according to claim 1, wherein the microprocessor is further programmed to execute a naming task that displays in the second touch screen area, names of the functions assigned to the second user-defined keys in association with the second user-defined keys, respectively.

3. A mixing console according to claim 1, wherein the microprocessor is further programmed to execute a set-up display task that displays in the key setup screen:

in a case where the first user-defined key has been selected as a target to be specified on the setup screen, at least a size, a display color, and a name of a function of the selected first user-defined key are allowed to be specified on the key setup screen;

in a case where the second user-defined key has been selected as a target to be specified on the setup screen, at least a display color used in a display area and a name of a function assigned to the selected second user-defined key are allowed to be specified on the key setup screen, while not allowing specification of the size.

* * * * *